US012475768B1

(12) United States Patent
Wei et al.

(10) Patent No.: US 12,475,768 B1
(45) Date of Patent: Nov. 18, 2025

(54) CLAW MACHINE WITH AUTOMATIC OBJECT PLACEMENT FUNCTION

(71) Applicant: PAOKAI ELECTRONIC ENTERPRISE CO., LTD., Kaohsiung (TW)

(72) Inventors: Ming-Shan Wei, Kaohsiung (TW); Tung-Ying Wei, Kaohsiung (TW)

(73) Assignee: PAOKAI ELECTRONIC ENTERPRISE CO., LTD., Kaohsiung (TW)

( * ) Notice: Subject to any disclaimer, the term of this patent is extended or adjusted under 35 U.S.C. 154(b) by 0 days.

(21) Appl. No.: 18/956,986

(22) Filed: Nov. 22, 2024

(30) Foreign Application Priority Data

Jul. 16, 2024 (TW) ................................ 113126605

(51) Int. Cl.
*G07F 17/32* (2006.01)

(52) U.S. Cl.
CPC ...... *G07F 17/3295* (2013.01); *G07F 17/3202* (2013.01); *G07F 17/3297* (2013.01)

(58) Field of Classification Search
CPC ............. G07F 17/3295; G07F 17/3202; G07F 17/3297
See application file for complete search history.

(56) References Cited

U.S. PATENT DOCUMENTS

2020/0302753 A1 9/2020 Kim
2022/0379196 A1 12/2022 Gottesman et al.

FOREIGN PATENT DOCUMENTS

CN 108654076 A 10/2018
JP H0824433 A 1/1996
TW M559199 U 5/2018
TW 202211966 A 4/2022

OTHER PUBLICATIONS

Search Report appended to an Office Action, which was issued to Taiwanese counterpart application No. 113126605 by the TIPO on Mar. 3, 2025, with an English translation thereof.

*Primary Examiner* — Kevin Y Kim
(74) *Attorney, Agent, or Firm* — Nixon & Vanderhye PC

(57) ABSTRACT

A claw machine includes a cabinet, an operating unit, a sensing unit and a control unit. The cabinet defines an inner space allowing an object to be placed therein, and has an output hole spatially communicating with the inner space. A chance area is defined nearby the output hole. The operating unit is disposed in the inner space, and includes a moving mechanism and a claw mechanism that is configured to grab the object. The sensing unit includes a first sensor that is configured to detect a status of the object, thereby generating reference information, and a second sensor that is configured to generate a notification in response to determining that the chance area is empty. The control unit is configured to, in response to receiving the notification, control the operating unit based on the reference information, so as to move the object to the chance area.

16 Claims, 4 Drawing Sheets

CLAW MACHINE WITH AUTOMATIC OBJECT PLACEMENT FUNCTION

CROSS-REFERENCE TO RELATED APPLICATION

This application claims priority to Taiwanese Invention patent application No. 113126605, filed on Jul. 16, 2024, the entire disclosure of which is incorporated by reference herein.

FIELD

The disclosure relates to a game machine, and more particularly to a claw machine with an automatic object placement function.

BACKGROUND

Referring to FIG. 1, a conventional claw machine 1 includes a cabinet 10 that defines an inner space 100 allowing a plurality of objects (not shown) to be placed therein, a claw mechanism 11 that is disposed in the inner space 100 and that is configured to grab any of the objects, and an operating interface 12 that is connected to the cabinet 10 and that is configured to be operated to control movement of the claw mechanism 11. In practice, after inserting a coin into the conventional claw machine 1, a player may operate the claw mechanism 11 through the operating interface 12 to grab any of the objects in the inner space 100. The objects that are placed in the inner space 100 of the conventional claw machine 1 are usually a primary factor that lures players into playing the conventional claw machine 1.

When performing maintenance for the conventional claw machine 1, an owner of the conventional claw machine 1 may need to adjust the claw mechanism 11, and adjust positions of the objects in the inner space 100 regularly. For example, if some of the objects are placed close to an output hole 13 of the conventional claw machine 1, the players may think that they have a better chance of successfully grabbing one of the objects, and they may be willing to insert coins to play a game; on the contrary, if the objects are not close to the output hole 13, or the objects seem to be hard to get, the players may be unwilling to play the conventional claw machine 1. Therefore, in addition to selecting proper objects to be placed in the conventional claw machine 1, the owner would also need to frequently adjust positions of the objects to attract players.

However, it would be unrealistic for the owner to be around the conventional claw machine 1 constantly to timely adjust positions of the objects, and even if there is a camera installed in the inner space 100 for continuously monitoring the placement of the objects, the owner may still be unable to timely reach the conventional claw machine 1 to adjust positions of the objects due to traffic or time constraints.

SUMMARY

Therefore, an object of the disclosure is to provide a claw machine with an automatic object placement function that can alleviate at least one of the drawbacks of the prior art.

According to the disclosure, a claw machine with an automatic object placement function is provided. The claw machine has an object placed therein, and includes a cabinet, an operating unit, a sensing unit and a control unit. The cabinet defines an inner space that allows the object to be placed therein, and has an output hole that is in spatial communication with the inner space and that is for retrieving the object. A chance area is defined to be nearby the output hole. The operating unit is disposed in the inner space, and includes a moving mechanism and a claw mechanism that is movably connected to the moving mechanism and that is configured to grab the object. The sensing unit includes a first sensor that is configured to detect a status of the object, thereby generating reference information, and a second sensor that is configured to generate a notification in response to determining that the chance area is empty. The control unit is electrically connected to the operating unit and the sensing unit, and is configured to, in response to receiving the notification, control the moving mechanism and the claw mechanism based on the reference information, so as to move the object to the chance area.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
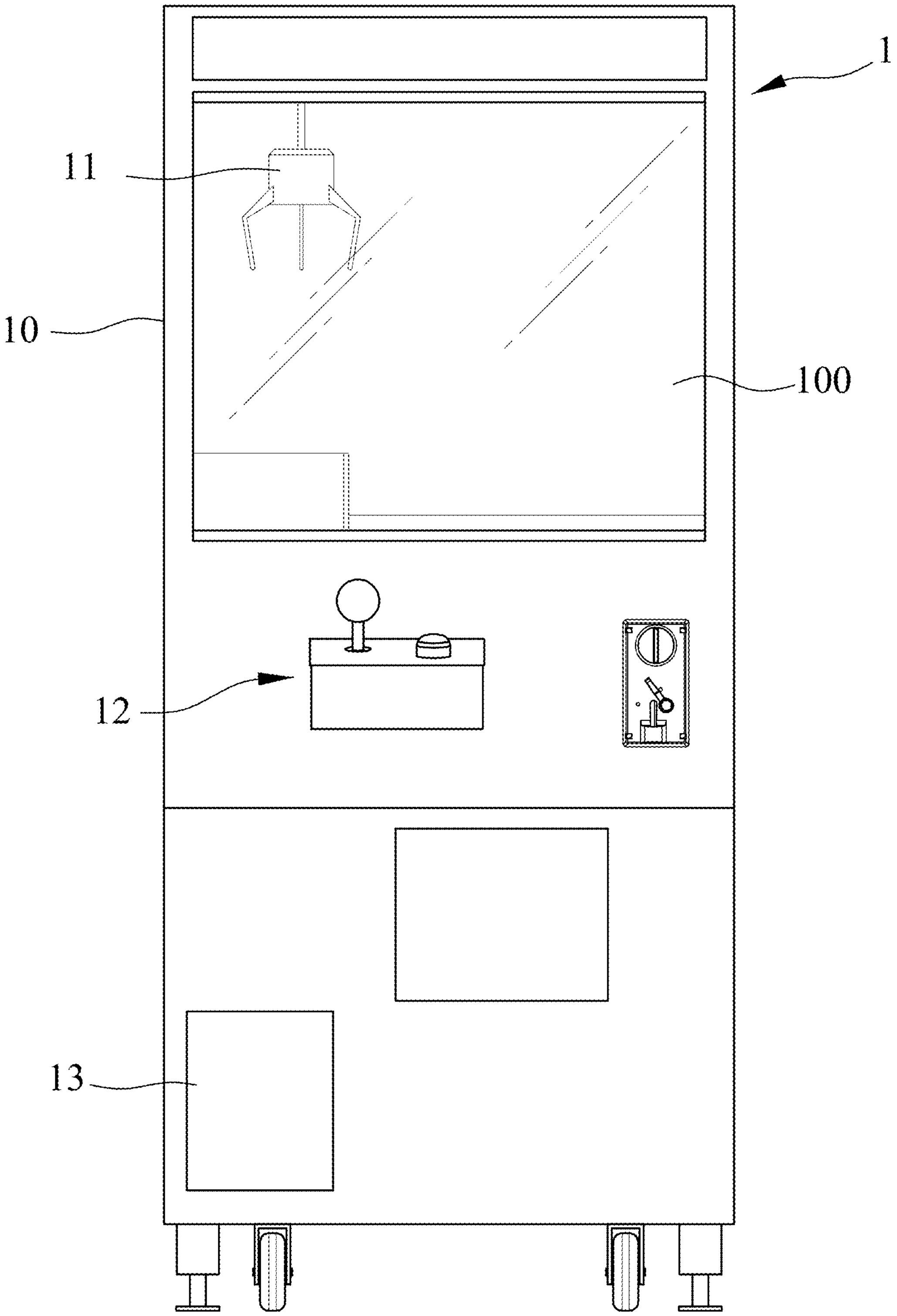
FIG. 1 PRIOR ART
FIG. 1 is a front view illustrating a conventional claw machine.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
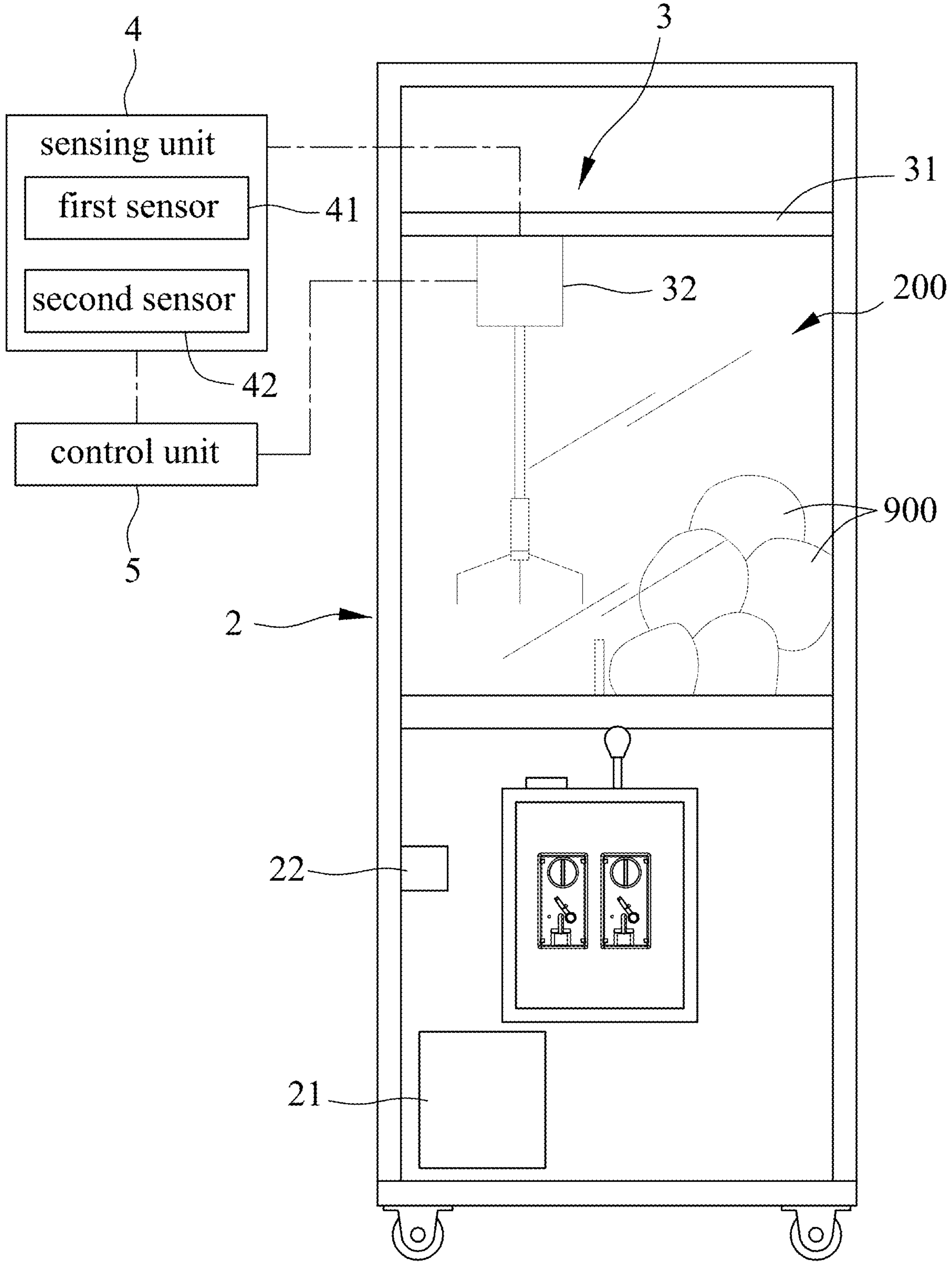
FIG. 2 is a schematic view illustrating a claw machine with an automatic object placement function according to an embodiment of the disclosure.

Referring to FIG. 2, a claw machine with an automatic object placement function according to an embodiment of the disclosure includes a cabinet 2 that defines an inner space 200 that allows a plurality of objects 900 to be placed therein, an operating unit 3 that is disposed in the inner space 200, a sensing unit 4, and a control unit 5 that is electrically connected to the operating unit 3 and the sensing unit 4. In this embodiment, the sensing unit 4 is disposed to be spaced apart from the operating unit 3; in some embodiments, the sensing unit 4 is disposed inside the claw machine, in some embodiments, the sensing unit 4 is disposed outside the claw machine, and in some embodiments, the sensing unit 4 is attached to the operating unit 3. In some embodiments, there may be only one object 900 being placed in the inner space 200, but this disclosure is not limited in this respect.

Figure 3:
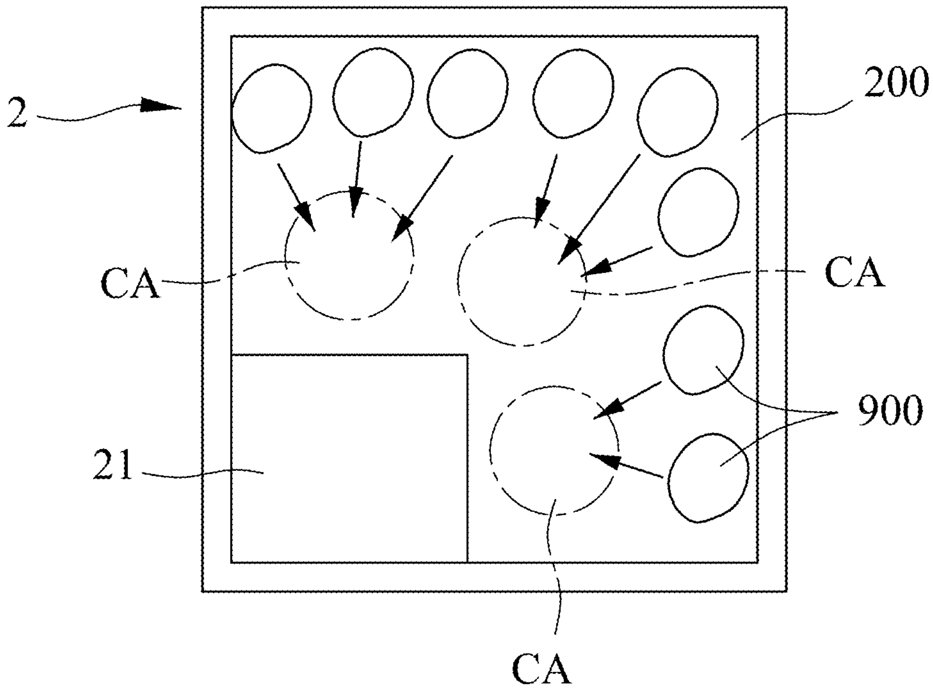
FIG. 3 is a top view illustrating an inner space of the claw machine according to an embodiment of the disclosure.

The cabinet 2 has an output hole 21 that is in spatial communication with the inner space 200 and that is for retrieving any of the objects 900, and includes an object sensor 22 that is disposed in the output hole 21 and that is configured to determine whether any of the objects 900 has passed by the object sensor 22 (i.e., has been dropped from the inner space 200 to the output hole 21). In one example, the object sensor 22 adopts an optical determination mechanism (e.g., a photo interrupter), and generates a detection signal when determining that any of the objects 900 has passed through the output hole 21 (i.e., has passed by the object sensor 22), where the detection signal is sent to the control unit 5. As shown in FIG. 3, at least one chance area (CA) is defined to be nearby the output hole 21. It should be noted that, three chance areas (CA) are defined in FIG. 3 as one example, but in some embodiments, a quantity of the at least one chance area (CA) may be more or less than three depending on sizes and/or shapes of the objects 900. Therefore, any area that is nearby the output hole 21 and that has the potential to attract players to play the claw machine may be defined as the chance area (CA).

Referring to FIGS. 2 and 3, the operating unit 3 includes a moving mechanism 31 (e.g., a gantry mechanism) that is mounted in a top portion of the inner space 200, and a claw mechanism 32 that is movably connected to the moving mechanism 31 and that is configured to grab any of the objects 900. In one example, the claw mechanism 32 includes a driving coil of which one or more relevant electrical parameters (e.g., electric current provided to the driving coil) may be adjusted to control a claw to grip or to release, and to adjust a grip strength of the claw.

In this embodiment, the sensing unit 4 is disposed to be spaced apart from the claw mechanism 32 of the operating unit 3, and includes a first sensor 41 and a second sensor 42. The first sensor 41 is configured to detect a status of a target object that is any of the objects 900 to be moved by the claw mechanism 32, thereby generating reference information, and is further configured to send the reference information to the control unit 5. The second sensor 42 is configured to generate a notification in response to determining that the at least one chance area (CA) is empty, and is further configured to send the notification to the control unit 5.

A main function of the first sensor 41 is to determine a relative position of the target object to the claw mechanism 32, and to further determine a process of the claw mechanism 32 grabbing the target object. In some embodiments, the first sensor 41 is an optical sensor, and the reference information indicates whether the target object is grabbed by the claw mechanism 32. In some embodiments, the first sensor 41 is a distance sensor, and the reference information indicates a distance between the claw mechanism 32 and the target object. In some embodiments, the first sensor 41 is an image recognition system that is configured to obtain a video of the objects 900 (e.g., indicating locations of the objects 900 in the inner space 200) and the process of the claw mechanism 32 grabbing the target object as the reference information, and to provide the video (e.g., including information of the way the target object was dropped, when the target object was dropped, how long the claw mechanism 32 contacted the target object, and/or whether the target object was dropped into the output hole 21) to the control unit 5 as a reference for the control unit 5 to control the claw mechanism 32. In some embodiments, the second sensor 42 is an optical sensor that is configured to detect whether the at least one chance area (CA) is empty. In some embodiments, the second sensor 42 may be disposed in the top portion or a bottom portion of the inner space 200 corresponding in position to the at least one chance area (CA). In some embodiments, the second sensor 42 is an image recognition system that is configured to obtain a video of the at least one chance area (CA), and to determine whether the at least one chance area (CA) is empty based on this video, and may be disposed in the top portion of the inner space 200 so as to capture the at least one chance area (CA). In a case where each of the first sensor 41 and the second sensor 42 is implemented with an image recognition system, one image recognition system that includes functions of both the first sensor 41 and the second sensor 42 may be used.

The control unit 5 may be a software, a hardware, and/or a firmware device that is capable of performing calculations and controlling operation of the operating unit 3 based on the reference information. In this embodiment, the control unit 5 may be implemented by a central processing unit (CPU), a microcontroller (MCU), or any circuit capable of implementing functionalities of this disclosure. The control unit 5 is configured to, in response to receiving the notification from the second sensor 42 (i.e., when the second sensor 42 detects that the at least one chance area (CA) is empty), automatically control the moving mechanism 31 and the claw mechanism 32 based on the reference information, so as to move one or more of the objects 900 that are outside the at least one chance area (CA) to the at least one chance area (CA). In one example, the second sensor 42 sends the notification when determining that one of the at least one chance area (CA) is empty (i.e., one of the at least one chance area (CA) does not have any of the objects 900 placed therein). In another example, the second sensor 42 sends the notification when determining that all of the at least one chance area (CA) is empty (i.e., each of the at least one chance area (CA) does not have any of the objects 900 placed therein), but the disclosure is not limited to such.

Figure 4:
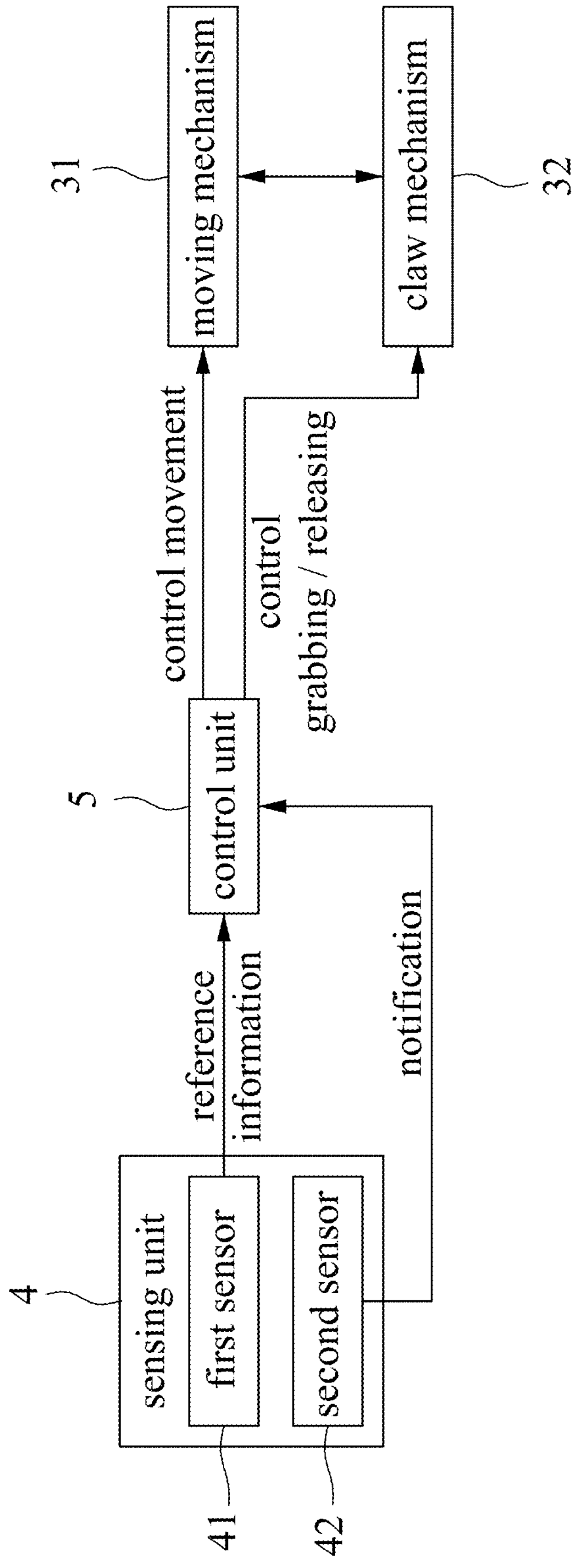
FIG. 4 is a block diagram illustrating operation of components of the claw machine according to an embodiment of the disclosure.

Referring further to FIG. 4, when an owner of the claw machine places the objects 900 in the inner space 200, the owner may place some of the objects 900 in the at least one chance area (CA), and may place the rest of the objects 900 in a portion of the inner space 200 that is outside the at least one chance area (CA) as backup objects. In one example, if those of the objects 900 in the at least one chance area (CA) were moved by the claw mechanism 32 controlled by a player, so the at least one chance area (CA) is now empty, the second sensor 42 would send the notification to the control unit 5. The control unit 5 may then determine, based on the reference information related to the backup objects, positions of the backup objects and/or distances from the claw mechanism 32 to the backup objects, and then control the moving mechanism 31 to move the claw mechanism 32 to grab and release one of the backup objects to the at least one chance area (CA), thus automatically performing object placement for the owner. In some examples, the backup object to be moved to the empty chance area(s) may be one that is closest to the claw mechanism 32. In some examples, the backup object to be moved to the empty chance area(s) may be one that is closest to the empty chance area(s). In some examples, the backup object to be moved to the empty chance area(s) may be one that is farthest from the empty chance area(s). In some examples, the backup object to be moved to the empty chance area(s) may be one that is farthest from the output hole 21. However, this disclosure is not limited in this respect.

It should be noted that, to ensure smooth operation of the claw machine, restrictions may be added to the control unit 5 to prevent the control unit 5 from automatically performing object placement while the player is playing the claw machine. In one example, the control unit 5 is configured to perform object placement when no coin has been inserted into the claw machine for a predetermined time period. In such a case, the claw machine further includes a coin sensor that is disposed in a coin inserting hole of the claw machine, and that is configured to send a signal to the control unit 5 when detecting that a coin has been inserted into the claw machine through the coin inserting hole. The control unit 5 may have a timing function (e.g., the control unit 5 may include a timer), and perform object placement when determining that no signal has been received from the coin sensor for the predetermined time period. The predetermined time period may be preset in the control unit 5 by the owner of the claw machine. However, in some embodiments, the claw machine may be paid through mobile payment, and in such a case, the control unit 5 is configured to control the claw machine to perform object placement when determining that no payment has been made through mobile payment for the predetermined time period.

In another example, the control unit 5 is configured to perform object placement when no one is in the vicinity of the claw machine for the predetermined time period. In such a case, the claw machine may further include an operating interface that is configured to be operated by the player, or may include a proximity sensor that is configured to detect presence of a person in the vicinity of the claw machine. As such, the control unit 5 may determine whether someone is close to the claw machine by determining whether the operating interface has been operated by the player, or whether the proximity sensor has detected presence of a person.

In another example, the control unit 5 is configured to perform object placement only during an off-peak period of the claw machine. In such a case, the off-peak period is preset in the control unit 5 by the owner of the claw machine, and the control unit 5 responds to the notification from the second sensor 42 only during the off-peak period. In yet another example, the control unit 5 is configured to perform object placement only when the at least one chance area (CA) is empty for another predetermined time period, thus preventing the control unit 5 from automatically performing object placement immediately after the at least one chance area (CA) is emptied by the player. In such a case, the another predetermined time period may be preset in the control unit 5 by the owner of the claw machine.

In summary, according to the disclosure, when the sensing unit 4 detects that the at least one chance area (CA) is empty, the control unit 5 controls the moving mechanism 31 and the claw mechanism 32 to move one of the backup objects to one of the at least one chance area (CA) based on the reference information. As such, the claw machine is able to automatically perform object placement, and does not require the owner to manually adjust object placements for attracting players.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A claw machine with an automatic object placement function, the claw machine having an object placed therein and comprising:

a cabinet defining an inner space that allows the object to be placed therein, and having an output hole that is in spatial communication with said inner space and that is for retrieving the object, where a chance area is defined to be nearby said output hole;

an operating unit disposed in said inner space and including a moving mechanism and a claw mechanism that is movably connected to said moving mechanism and that is configured to grab the object;

a sensing unit including a first sensor that is configured to detect a status of the object, thereby generating reference information, and a second sensor that is configured to generate a notification in response to determining that the chance area is empty; and a control unit electrically connected to said operating unit and said sensing unit, and configured to, in response to receiving the notification, control said moving mechanism and said claw mechanism based on the reference information, so as to move the object to the chance area.

2. The claw machine as claimed in claim 1, wherein said second sensor of said sensing unit is one of an optical sensor and an image recognition system.

3. The claw machine as claimed in claim 1, wherein said cabinet further includes an object sensor that is disposed in said output hole and that is configured to determine whether the object has passed by said object sensor.

4. The claw machine as claimed in claim 1, wherein said first sensor of said sensing unit is an optical sensor that is configured to detect whether the object is grabbed by said claw mechanism.

5. The claw machine as claimed in claim 4, wherein said second sensor of said sensing unit is one of an optical sensor and an image recognition system.

6. The claw machine as claimed in claim 4, wherein said cabinet further includes an object sensor that is disposed in said output hole and that is configured to determine whether the object has passed by said object sensor.

7. The claw machine as claimed in claim 1, wherein said first sensor of said sensing unit is a distance sensor that is configured to detect a distance between said claw mechanism and the object.

8. The claw machine as claimed in claim 7, wherein said second sensor of said sensing unit is one of an optical sensor and an image recognition system.

9. The claw machine as claimed in claim 7, wherein said cabinet further includes an object sensor that is disposed in said output hole and that is configured to determine whether the object has passed by said object sensor.

10. The claw machine as claimed in claim 1, wherein said first sensor of said sensing unit is an image recognition system that is configured to obtain a video of a process of the object being grabbed by said claw mechanism.

11. The claw machine as claimed in claim 10, wherein said second sensor of said sensing unit is one of an optical sensor and an image recognition system.

12. The claw machine as claimed in claim 10, wherein said cabinet further includes an object sensor that is disposed in said output hole and that is configured to determine whether the object has passed by said object sensor.

13. The claw machine as claimed in claim 1, wherein said control unit is configured to, in response to receiving the notification, automatically move the object to the chance area when determining that no coin has been inserted into the claw machine for a predetermined time period.

14. The claw machine as claimed in claim 1, further comprising a coin sensor disposed in a coin inserting hole of the claw machine, and configured to send a signal to said control unit in response to detecting that a coin has been inserted into the claw machine, wherein said control unit is configured to, in response to receiving the notification, automatically move the object to the chance area when determining that no signal has been received from said coin sensor for a predetermined time period.

15. The claw machine as claimed in claim 1, wherein said control unit is configured to, in response to receiving the notification, automatically move the object to the chance area during an off-peak period of the claw machine.

16. The claw machine as claimed in claim 1, wherein said control unit is configured to, in response to receiving the notification, automatically move the object to the chance area when the chance area is empty for a predetermined time period.

* * * * *